US012744592B2

(12) United States Patent
Roy

(10) Patent No.: US 12,744,592 B2
(45) Date of Patent: Sep. 22, 2026

(54) ADAPTIVE CONSTANT BIT RATE BANDWIDTH ALLOCATION FOR TRAFFIC OVER A SATELLITE NETWORK

(71) Applicant: Hughes Network Systems, LLC, Germantown, MD (US)

(72) Inventor: Satyajit Roy, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 315 days.

(21) Appl. No.: 18/513,064

(22) Filed: Nov. 17, 2023

(65) Prior Publication Data

US 2025/0167880 A1 May 22, 2025

(51) Int. Cl.
*H04B 7/185* (2006.01)
*H04L 43/0894* (2022.01)
*H04W 28/20* (2009.01)
*H04W 84/06* (2009.01)

(52) U.S. Cl.
CPC ..... *H04B 7/18584* (2013.01); *H04L 43/0894* (2013.01); *H04W 28/20* (2013.01); *H04W 84/06* (2013.01)

(58) Field of Classification Search
CPC ............ H04B 7/18584; H04L 43/0882; H04L 43/0894; H04L 47/76; H04L 47/787; H04L 47/801; H04L 65/765; H04L 65/80; H04L 2012/5608; H04W 28/20; H04W 84/06; H04W 84/12
See application file for complete search history.

(56) References Cited

U.S. PATENT DOCUMENTS

| | | | | |
|---|---|---|---|---|
| 7,873,074 | B1 | 1/2011 | Boland | |
| 2016/0006500 | A1* | 1/2016 | Radpour ............ | H04B 7/18539 455/427 |
| 2016/0072691 | A1 | 3/2016 | Xu et al. | |
| 2020/0245210 | A1* | 7/2020 | Fotheringham ......... | H04L 47/22 |
| 2021/0377960 | A1* | 12/2021 | Carl ...................... | H04W 72/52 |
| 2022/0014477 | A1 | 1/2022 | Ganesan et al. | |
| 2025/0150839 | A1* | 5/2025 | Moore .................. | H04B 10/27 |

OTHER PUBLICATIONS

"The International Search Report and Written Opinion" for Application No. PCT/US2024/054403, dated Feb. 6, 2025, 15 pages.

* cited by examiner

*Primary Examiner* — Donald L Mills
(74) *Attorney, Agent, or Firm* — Mannava & Kang, P.C.

(57) ABSTRACT

Systems and methods for bandwidth allocation for Voice over WiFi (VoWiFi) packet traffic in a satellite system is disclosed. The system may include a processor and a memory storing instructions which, when executed by the processor, cause the processor to determine whether there is any VoWiFi packet traffic over a satellite network link (such as, e.g., control and management packet traffic) and, if there is, allocate a guaranteed minimum bandwidth for the VoWiFi packet traffic. The processor may further provide a series of step bandwidth allocations based on the current level of VoWiFi packet traffic exceeding certain threshold values (e.g., as voice data packet traffic).

18 Claims, 7 Drawing Sheets

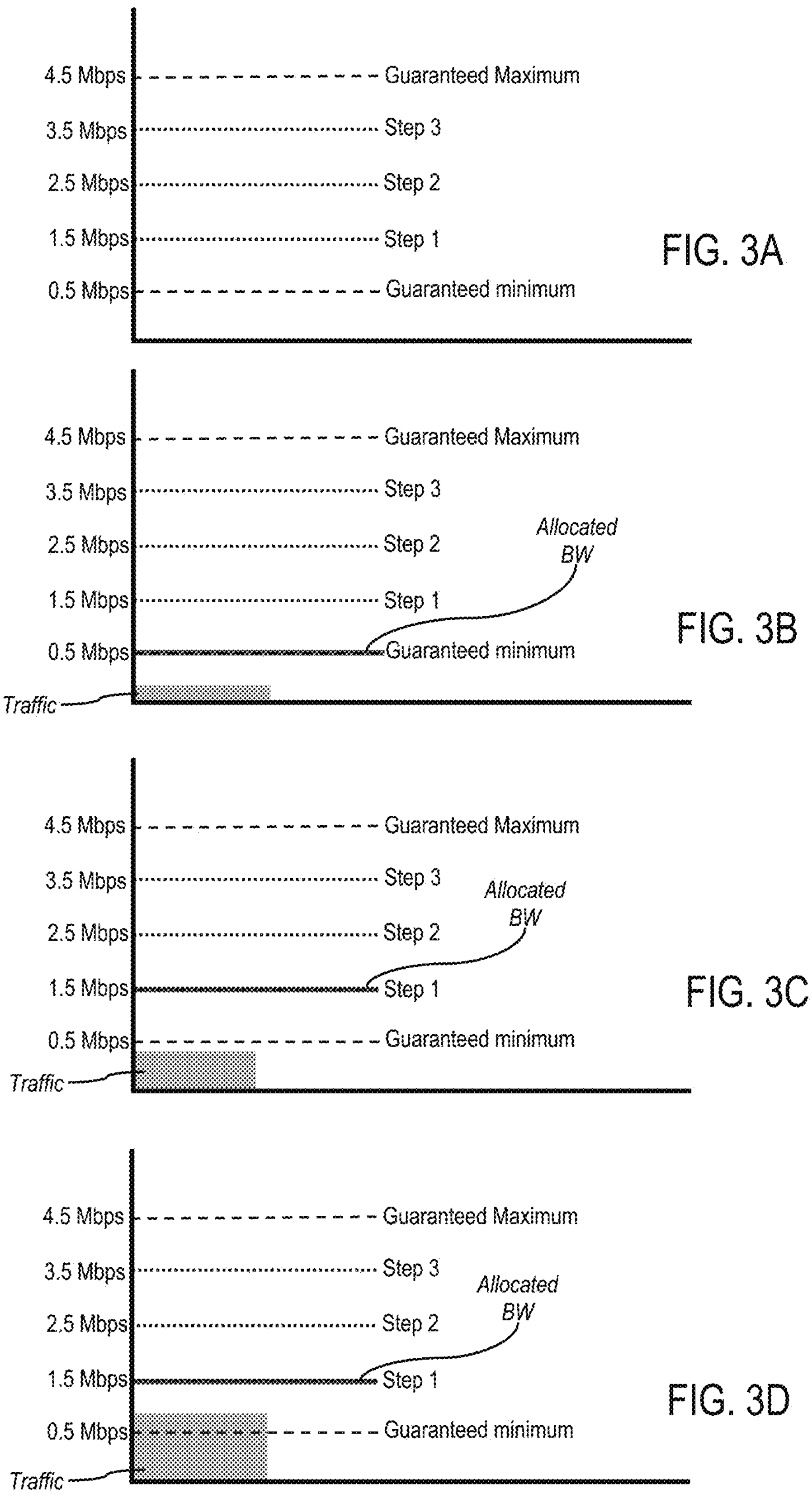
4.5 Mbps
3.5 Mbps
2.5 Mbps
1.5 Mbps
0.5 Mbps
Guaranteed Maximum
Step 3
Step 2
Step 1
Guaranteed minimum
FIG. 3A
4.5 Mbps
3.5 Mbps
2.5 Mbps
1.5 Mbps
0.5 Mbps
Guaranteed Maximum
Step 3
Step 2
Step 1
Guaranteed minimum
Allocated BW
Traffic
FIG. 3B
4.5 Mbps
3.5 Mbps
2.5 Mbps
1.5 Mbps
0.5 Mbps
Guaranteed Maximum
Step 3
Step 2
Step 1
Guaranteed minimum
Allocated BW
Traffic
FIG. 3C
4.5 Mbps
3.5 Mbps
2.5 Mbps
1.5 Mbps
0.5 Mbps
Guaranteed Maximum
Step 3
Step 2
Step 1
Guaranteed minimum
Allocated BW
Traffic
FIG. 3D

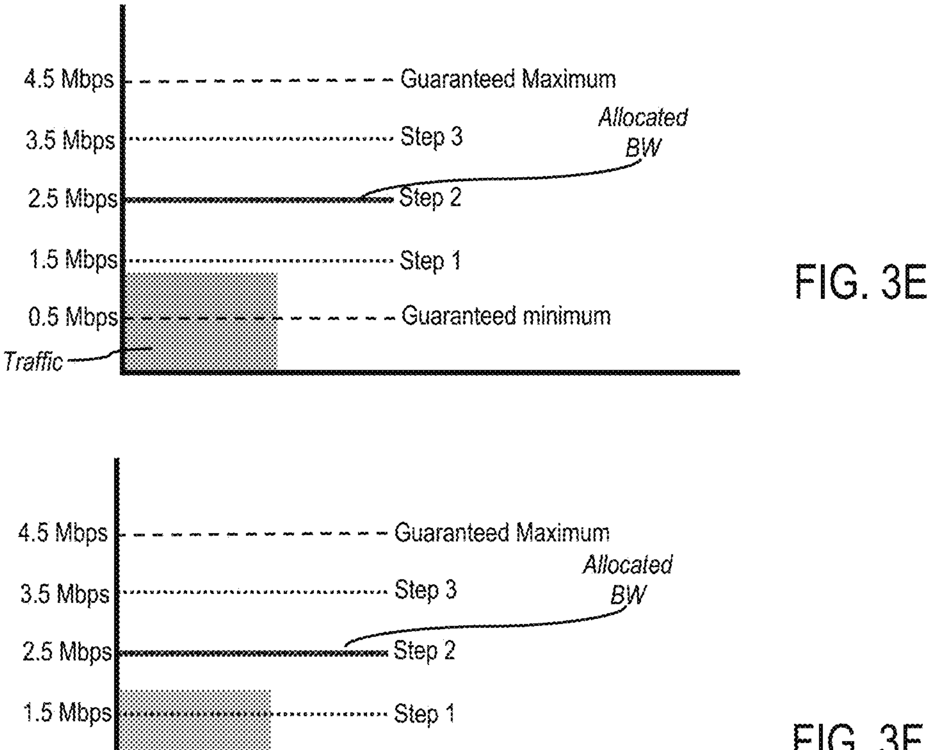
FIG. 3E
FIG. 3F
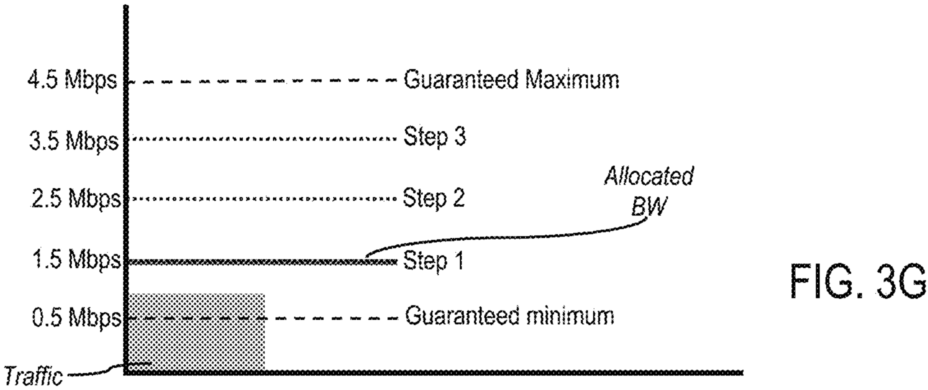
FIG. 3G

ADAPTIVE CONSTANT BIT RATE BANDWIDTH ALLOCATION FOR TRAFFIC OVER A SATELLITE NETWORK

TECHNICAL FIELD

This patent application is directed to satellite communication systems generally, and more specifically, to systems and methods for adaptive bandwidth allocation and volume monitoring of bandwidth allocation for Voice over WiFi (VoWiFi) calls over a satellite network.

BACKGROUND

Advances in telecommunications technologies are increasing availability of voice and data services to consumers. These technological developments are enabling all types of consumers to transmit and receive increasingly larger amounts of multimedia digital content, such as, for example, texts, streaming audio or video, social media or web content, digital entertainment, interactive gaming, or other digital content.

Satellite communication systems may be used to provision voice and data services. A Very Small Aperture Terminal (VSAT) is a two-way satellite ground station which may be used to transmit narrowband and/or broadband data, providing, e.g., Internet access, Voice over Internet Protocol (VoIP) service, or video capability. Like standard user equipment (UE) in a cellular network, a VSAT may also have a local wireless network capability based on protocols from the Institute of Electrical & Electronic Engineers (IEEE) 802.11 family of standards, commonly referred to as "WiFi." A VSAT with such WiFi capability may enable a user of a smartphone and/or a similar device to employ Voice over WiFi (VoWiFi), a service which enables users to place and receive voice calls over a wireless Internet connection rather than using a cellular network, thereby reducing costs and cellular network usage.

Because a VoWiFi call may consist of a live audio conversation between two or more people, a certain Quality of Service (QoS) may be desirable; accordingly, the communication system may allocate a certain guaranteed amount of network resources for initiating and maintaining a VoWiFi call. For instance, a constant bit rate (CBR) may be guaranteed for a VoWiFi call, and thus the communication system may allocate a set amount of CBR bandwidth to a VoWiFi call. However, while this set CBR allocation may guarantee QoS and Quality of Experience (QoE) for the VoWiFi call, it may also waste network resources depending upon how much of the set CBR allocation is being used at any particular moment in time, as any usage beneath the set CBR allocation may result in wasted, unused bandwidth. Accordingly, methods and systems which may provide a more efficient QoS for service providers while also providing sufficient QoE to end users making VoWiFi calls may be beneficial.

The VoWiFi service, which essentially uses the Voice over Internet Protocol (VoIP) over a WiFi network, may employ a number of other Internet Engineering Task Force (IETF) protocols, including, for example, the Session Initiation Protocol (SIP), the User Datagram Protocol (UDP) as a transport protocol, and the Internet Protocol Security (IPSec) suite of protocols for end-to-end encryption of packets. Many separate UDP sessions may be used to initiate and maintain a VoWiFi call, including separate UDP sessions for control/management data and voice data. In some cases, certain control/management sessions and voice data sessions may not be distinguishable from each other as packet traffic, at least in part because they may be IPSec encrypted. This inability to distinguish the two traffic flows may have undesirable consequences, as the timing and other requirements of the voice data packets are more stringent, and therefore require more communication network resources, than certain control/management data packets. For example, while the voice traffic data packets may require a certain CBR, the control/management data packets for the same VoWiFi call usually do not require a certain CBR, as the control/management traffic is typically sparse and intermittent. However, the inability to distinguish the two typically results in the VoWiFi control/management data packets receiving the same CBR as the VoWiFi voice data packets, again wasting communication network resources. Accordingly, more flexible and efficient methods and systems of provisioning network resources for VoWiFi calls may be beneficial.

BRIEF DESCRIPTION OF DRAWINGS

Features of the present disclosure are illustrated by way of example and not limited in the following Figure(s), in which like numerals indicate like elements, in which:

FIGS. 3A-3G are graphs of bandwidth usage accompanying the description of the method in FIGS. 2A and 2B for providing Adaptive Constant Bit Rate (ACBR) bandwidth allocation to real-time classified traffic in a satellite communication system, according to an example.

DETAILED DESCRIPTION

Figure 1:
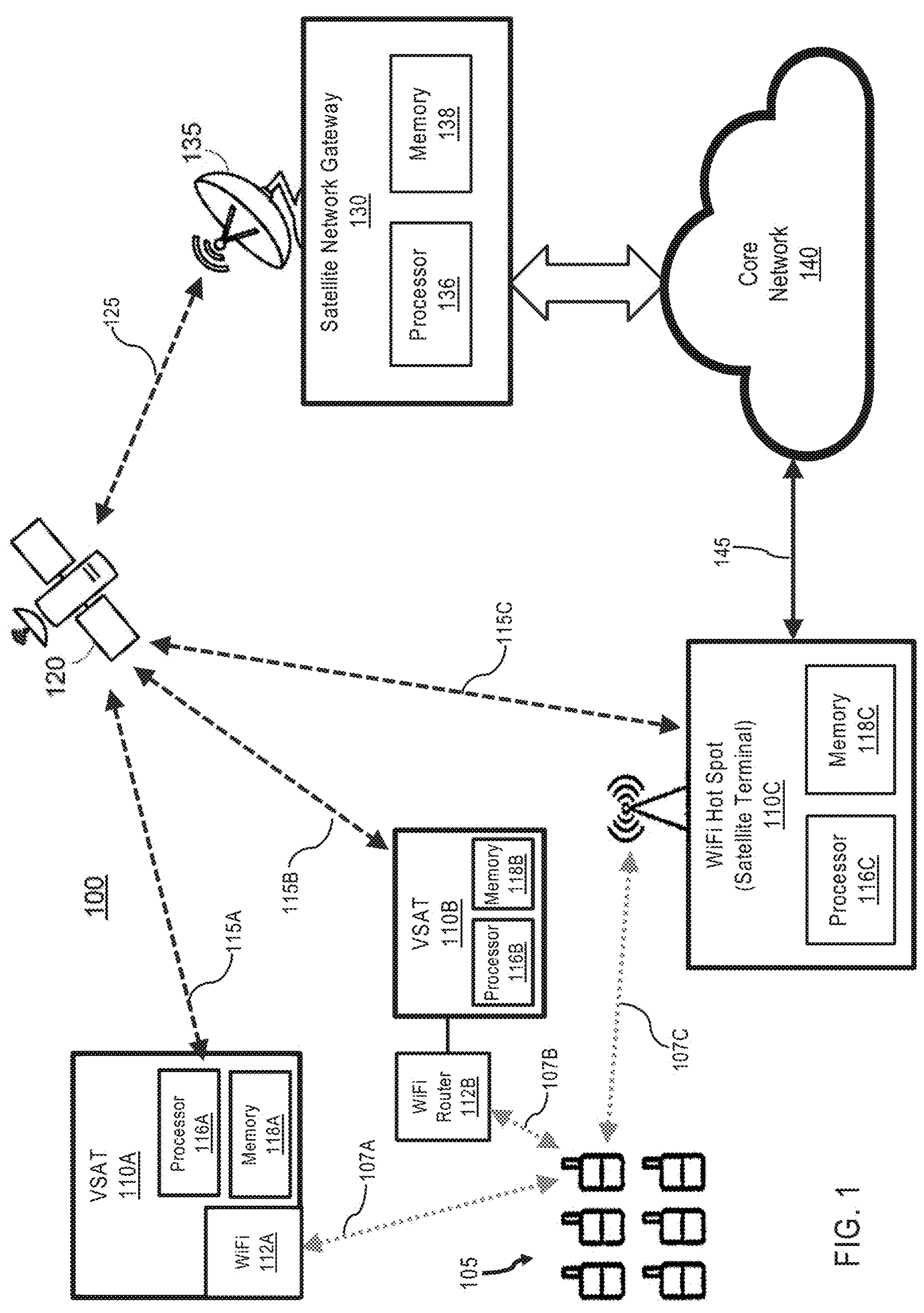
FIG. 1 illustrates a satellite communication system 100 capable of at least providing voice and/or data services, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, the Voice over WiFi (VoWiFi) service may be wasteful and inefficient in some cases, as outlined in more detail below. This waste and inefficiency may be particularly deleterious in the context of a satellite communications system, where bandwidth is a necessarily limited resource. It should be appreciated that because the VoWiFi service may be implemented via VoIP, the terms "VoWiFi" and "VoIP" may be used interchangeably in some contexts in the present disclosure.

Typically, a VoWiFi call is allocated a set CBR and, for every new VoWiFi call detected, the same set CBR is also additionally allocated—i.e., a fixed amount of bandwidth is reserved for each VoWiFi call. The reserved bandwidth is released after either there is explicit control messaging indicated the VoWiFi call has ended or there is a timeout after no VoWiFi packets are detected. This may be problematic because, as discussed above, the control/management VoWiFi packet traffic may be indistinguishable from the voice data VoWiFi packet traffic. Furthermore, all VoWiFi packet traffic may be IPSec encrypted and thus may be unreadable by any intermediate servers and routers.

For example, a VoWiFi call may have an IPSec Internet Security Association and Key Management Protocol (ISAKMP) UDP session and an IPSec voice data UDP session with identical UDP source and destination ports, as well as the same Differentiated Services Code Point (DSCP) in the Differentiated Services (DS) Field of their packet headers. Thus, when a ISAKMP packet is detected, the communication system may automatically allocate the set CBR bandwidth even though there is no VoWiFi call yet—i.e., if the ISAKMP packet was merely part of the initial authentication and key exchange for an IPSec end-to-end encryption, but the end user had yet to make a phone call. Moreover, as similar control/management traffic is also generated after the actual VoWiFi call has terminated, the communication system may maintain the fixed CBR allocation even though no VoWiFi call exists anymore.

To address these issues, systems and methods for providing an Adaptive Constant Bit Rate (ACBR) bandwidth for real-time classified traffic in a satellite communication system are described herein. In some examples, all VoWiFi packet traffic (both voice data and control/management data) are classified as real-time packet traffic. However, instead of a fixed CBR allocation, a minimum guaranteed bandwidth is allocated when VoWiFi packet traffic is first detected (i.e., when IPSec control traffic is detected, before an actual VoWiFi call is made). Thus, if no VoWiFi call is made (and there is only control/management packet traffic) and/or during the time before any VoWiFi call is made, less resources are allocated. In some examples, the VoWiFi allocation is increased in a series of discrete steps as more VoWiFi calls are added (and/or more real-time traffic, i.e., the bandwidth usage of the VoWiFi packet traffic, detected). In some examples, each step may occur when a pre-set threshold of real-time traffic (i.e., the bandwidth usage of the VoWiFi packet traffic) is reached.

Accordingly, the systems and methods described herein may increase network efficiency and reduce the waste of resources in a satellite communication system. These and other benefits and advantages may be apparent in the examples outlined below.

FIG. 1 illustrates a satellite communication system 100 capable of at least providing voice and/or data services, according to an example. The satellite communication system 100 may include any number of satellite terminals 110, a satellite 120, and a satellite network gateway 130, which may be connected to any one or more communication networks and/or systems. It should be appreciated that the satellite communication system 100 depicted in FIG. 1 may be an example. Thus, the satellite communication system 100 may or may not include additional features and some of the features described herein may be removed and/or modified without departing from the scopes of the satellite communication system 100 outlined herein.

The satellite terminals 110 may be of any type and/or variety—for example, the satellite terminals 110 may be customer terminals, such as very small aperture terminals (VSATs). The satellite terminals 110 may be mounted on a structure, habitat, or other object or location. Depending on the implementation, the satellite terminals 110 may include or incorporate any number of antenna dishes, which may be provided in various sizes, depths, or dimensions (e.g., small, medium, large, etc.). Although the satellite terminals 110 may typically remain in the same location once mounted, the satellite terminals 110 may be removed from their mounts, relocated to another location, and/or may be configured to be mobile terminals. For instance, the satellite terminals 110 may be mounted on mobile platforms that facilitate transportation thereof from one location to another. Such mobile platforms may include, for example, any number of mobile vehicles, such as cars, buses, boats, planes, etc. It should be appreciated that such satellite terminals 110 may generally be operational when still and not while being transported. That said, there may be scenarios where the satellite terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of consumer devices 105 capable of communication may be communicatively coupled to the satellite terminals 110. In some examples, such consumer devices 105 may include any type of computing or mobile device, such as, e.g., a laptop, a tablet, a mobile phone, an appliance, a camera, a sensor, a thermostat, a vehicle, a display, etc. In general, the consumer devices 105 may include, without limitation, any number of network-enabled computing devices, elements, or systems. It should be appreciated that a network of such devices may be commonly referred to as the "Internet of Things" (IoT).

As shown in FIG. 1, there may be a plurality of satellite terminals 110. In some examples, each of the plurality of satellite terminals 110 may be capable of making a VoWiFi call using the satellite communication system 100. In some examples, any of the plurality of satellite terminals 110 may be capable of communication with Geosynchronous Equatorial Orbit (GEO) satellites, Low Earth Orbit (LEO) satellites, Mid-Earth Orbit (MEO) satellites, High Earth Orbit (HEO) satellites, and/or may have a hybrid capability of communicating with any two or more types of satellites.

In some examples, there may be a VSAT 110A which has a built-in WiFi transceiver 112A. For such a VSAT 110A, any of the consumer devices 105 may initiate a VoWiFi call by employing a WiFi connection 107A with the VSAT 110A which may form the VoWiFi connection over a satellite link 115A with the satellite communication system 100. In some examples, there may be a VSAT 110B which has a wired and/or wireless connection with a WiFi Router 112B. For such a VSAT 110B, any of the consumer devices 105 may initiate a VoWiFi call by employing a WiFi connection 107B using the WiFi Router 112B with the VSAT 110B which may form the VoWiFi connection over a satellite link 115B with the satellite communication system 100. In some examples, there may be a WiFi hot spot terminal 110C with which any of the consumer devices 105 may initiate a VoWiFi call by connecting over a WiFi connection 107C with the WiFi hot spot terminal 110C, which, in turn, may form the VoWiFi connection over a satellite link 115C with the satellite communication system 100. In such examples, as discussed in further detail below, the WiFi hot spot terminal 110C may also perform some of the call management and provisioning. In some examples, the WiFi hot spot terminal 110C may employ a terrestrial backhaul network to provide the VoWiFi service.

The VSAT 110A, the VSAT 110B, and/or the WiFi hot spot terminal 110C may include various components, implemented in hardware, software, or a combination thereof, to facilitate communication both within and without the satellite communication system 100. In some examples, the VSAT 110A may include a processor 116A and a memory 118A; the VSAT 110B may include a processor 116B and a memory 118B; and the WiFi hot spot terminal 110C may include a processor 116C and a memory 118C. Any of processor 116A, processor 116B, and/or processor 116C may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices. Any of the memory 118A, the memory 118B, and/or the memory 118C may be a standard computer-readable medium for storage and/or retrieval of information, such as a fixed disk drive (internal or external), and may be used, for example, to store and provide access to information pertaining to various operations of and in, respectively, the VSAT 110A, the VSAT 110B, and/or the WiFi hot spot terminal 110C. Any of the memory 118A, the memory 118B, and/or the memory 118C may include a non-transitory computer-readable storage medium having an executable stored thereon, which when executed instructs the processor 116A, the processor 116B, and/or the processor 116C, respectively, to perform any of the methods described herein.

In some examples, any of the memory 118A, the memory 118B, and/or the memory 118C may include read-only memory (ROM), flash memory, and/or random access memory (RAM)—any of which may be the main memory into which an operating system, various application programs, and/or a Basic Input-Output system (BIOS) which controls basic hardware operation such as the interaction with one or more peripheral components may be loaded/stored. Code or computer-readable instructions to implement the methods of the present disclosure may be stored in computer-readable storage media such as one or more of the memories 118A, the memory 118B, the memory 118C, or other suitable storage. Code or computer-readable instructions to implement the methods of the present disclosure may also be received via one or more interfaces and/or stored in other memory. An operating system may be provided on any of the processor 116A, the processor 116B, and/or the processor 116C, including, e.g., MS-DOS®, MS-WINDOWS®, OS/2®, OS X®, IOS®, ANDROID®, UNIX®, Linux®, or another operating system, as would be understood by one of ordinary skill in the art.

The WiFi hot spot terminal 110C may be communicatively coupled with the core network 140. In some examples, the core network 140 may include, and/or be communicatively coupled to, a network interface that includes networking components specific to interfacing with the WiFi hot spot terminal 110C to provide a wired and/or wireless connection 145 with the core network 140. Such networking components may include, for example, one or more core network nodes, one or more Baseband Units (BBUs), and/or one or more Remote Radio Units (RRUs). In some examples, one or more Baseband Units (BBUs) coupled through a core network node may interface a communication signal from the core network 140 and transport the communication signal as a baseband signal over a wired medium (e.g., fiber optic, telephone, and/or coaxial cable) to one or more Remote Radio Units (RRUs). The one or more Remote Radio Units (RRUs) may interface the baseband signal from the one or more Baseband Units (BBUs) and provide a signal conversion between the baseband signal and a wireless signal complying with a specific communication protocol (such as, e.g., 5G) for communication with the WiFi hot spot terminal 110C. In some examples, one or more Baseband Units (BBUs), core network nodes, and/or other networking components may provide a wired communication path as the connection 145 from the core network 140 to the WiFi hot spot terminal 110C.

The satellite 120 may be an object intentionally placed into orbit. In some examples, the satellite 120 may be an artificial satellite that is configured to transmit and receive data signals. For example, the satellite 120 may form one or more beams and provide connectivity between at least the satellite terminals 110 and the satellite network gateway 130. More specifically, the satellite 120 may communicate data, control, and other signals using these beams with the satellite terminals 110 via terminal return and forward channels over a satellite link, such as, e.g., satellite links 115A, 115B, and 115C. The satellite 120 may communicate data, control, and other signals using these beams with the satellite network gateway 130 via a gateway return and forward channels over a satellite link 125. It should be appreciated that the satellite 120 may form any number of beams to communicate data signals with any number of components, even beyond the satellite terminals 110 or the satellite network gateway 130 as shown.

In some examples, the satellite 120 may be a communication satellite, such as a high-throughput satellite, which may include any satellite that is capable of providing at least twice (e.g., 20+ times, 100+ times, etc.) the total amount of throughput as a classic fixed-satellite service (FSS) satellite. In some examples, the satellite 120 may include, but not limited to, a transponded satellite, a regenerative satellite, and/or other similar satellite that may generate one or more spot beams. Furthermore, in some examples, the satellite 120 may operate in geosynchronous, mid-earth, low-earth, elliptical, or some other orbital configuration.

The satellite network gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. In some examples, the transceiver 135 may be useable, by the satellite network gateway 130 of satellite communication system 100, to transmit and receive data from the satellite terminals 110, via communications from the satellite 120, and may be configured to route data and traffic from these satellite terminals 110 to any other network, communication node, or communication element/component in operative communication with the satellite network gateway 130, which may include, for example, a network data center, a network management system (NMS), a local area network (LAN), a wide area network (WAN), the Internet or other publicly accessible network, a private network, a virtual network operator (VNO), a telecommunications network (such as, e.g., a cellular network), a cable network, or any other type of communication system/network, as would be understood by one of ordinary skill in the art. Although depicted as a single element, the satellite network gateway 130 may include a single gateway, multiple gateways residing locally or remotely, in full or in part, relative to the other system components. As described in more detail below, the satellite network gateway 130 may provide operations associated with providing VoWiFi service.

The satellite network gateway 130 may be communicatively coupled with the core network 140. In some examples, the satellite network gateway 130 may include a network interface that includes networking components specific to interfacing with communication signals in the core network 140. Such networking components may include, for example, one or more edge routers, and one or more processors capable of implementing edge functions, applications, and/or services employed in the core network 140, as would be understood by one of ordinary skill in the art.

In some examples, the satellite network gateway 130 may include various components, implemented in hardware, software, or a combination thereof, to facilitate communication both within and without the satellite communication system 100. In some examples, the gateway 130 may include a processor 136 and a memory 138.

While generically illustrated, the processor 136 may be the central processing unit (CPU) of the satellite network gateway 130 and may control overall operation of the satellite network gateway 130. In some examples, the processor 136 may accomplish this by executing software or firmware stored in memory 138 or other storage. The processor 136 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices. The memory 138 may be a standard computer-readable medium for storage and/or retrieval of information, such as a fixed disk drive (internal or external), and may be used, for example, to store and provide access to information pertaining to various operations of and in the satellite communication system 100. The memory 138 may include a non-transitory computer-readable storage medium having an executable stored thereon, which when executed instructs the processor 136 to perform any of the methods described herein. The memory 138 may include read-only memory (ROM), flash memory, and/or random access memory (RAM)—any of which may be the main memory into which an operating system, various application programs, and/or a Basic Input-Output system (BIOS) which controls basic hardware operation such as the interaction with one or more peripheral components may be loaded/stored. Code or computer-readable instructions to implement the methods of the present disclosure may be stored in computer-readable storage media such as one or more of memory 138 or other storage. Code or computer-readable instructions to implement the methods of the present disclosure may also be received via one or more interfaces and/or stored in other memory. An operating system may be provided on processor 136, including, e.g., MS-DOS®, MS-WINDOWS®, OS/2®, OS X®, IOS®, ANDROID®, UNIX®, Linux®, or another operating system, as would be understood by one of ordinary skill in the art. Although each are depicted as sole separate elements, the processor 136 and/or the memory 138 may be configured together as a single element, may each be separated into multiple components, or one or more arrays of elements. For example, the satellite network gateway 130 may include any number of processors, memories, and/or data stores in order to accommodate the needs of a particular system implementation.

The satellite network gateway 130 may also include other components, such as a baseband component, a network interface, and a fault management unit. In some examples, the baseband component may process signals being transmitted to, or received from, the satellite 120. For example, the baseband component may further include any number of modulator/demodulator units, system timing equipment, switching devices, etc. Other various components or units may also be provided. In some examples, the network interface may include at least one edge router for establishing connections with a terrestrial connection point from a service provider (which may or may not be included in the core network 140). Depending on the specific implementation, however, multiple terrestrial connection points may be utilized. The network interface may therefore provide a direct or indirect connection from one network element to another and facilitate communication and between various network elements.

The satellite network gateway 130 may help facilitate a traffic processing function, which may allow forwarding and protocol processing between external public networks and private networks and gateway communication channels. Although depicted in FIG. 1 as a separate and distinct element, the satellite network gateway 130, in some examples, may be separated into numerous components in multiple locations and/or integrated, fully or partially, with other components. The satellite network gateway 130 may include many other functions not directly referenced in this description and therefore omitted for clarity. Additionally, given architectures might place certain functions within the satellite network gateway 130 and might place certain functions or elements outside of the satellite network gateway 130. Such differences are not material to the design disclosed here. Furthermore, there may implementations where the satellite communication system 100 and/or other components in FIG. 1 may utilize any combination of multiple gateways, network data centers, network management systems, etc. to perform the methods as described herein.

The core network 140 may include a cellular core network or any other type of telecommunications network, which may further use one or more telecommunications protocols (such as, e.g., LTE, 5G, 6G, etc.), as would be understood by one of ordinary skill in the art. In some examples, the core network 140 may include, and/or communicatively connected to, one or more public networks, one or more private networks, and/or the Internet, and may employ one or more terrestrial wired or wireless communication links, such as, for example, fiber optical line, telephone line, coaxial cable, and/or cellular radio. In some examples, the core network may include one or more core network nodes, which may provide an interface with other networks and/or user equipment (UE), and, as discussed above, may also include one or more Baseband Units (BBUs), and/or one or more Remote Radio Units (RRUs). In some examples, the core network 140 may be employed to facilitate communication various user equipment and/or Customer Premise Equipment (CPE), such as, e.g., phones, smartphones, tablet computers, laptop computers, smart speakers, smart televisions, thermostats, home assistants, ovens, smart appliances, and other Internet of Things (IoT) devices.

While the processors, components, elements, systems, subsystems, and/or other computing devices may be shown as single components or elements in FIG. 1, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the satellite communication system 100 and/or any components shown in FIG. 1.

According to examples of the present disclosure, adaptive bandwidth allocation and volume monitoring may be performed by the VSAT 110A and/or VSAT 110B (hereinafter, "the VSAT(s) 110A/110B"), the satellite network gateway 130, and/or the WiFi hot spot terminal 110C. In some examples, the VSAT(s) 110A/110B, the satellite network gateway 130, and/or the WiFi hot spot terminal 110C provide Adaptive Constant Bit Rate (ACBR) bandwidth for the real time classified traffic in the system. In some examples, the VSAT(s) 110A/110B, the satellite network gateway 130, and/or the WiFi hot spot terminal 110C classifies any IPsec VoWiFi session (both voice data and control/management data) in the satellite communication system 100 as real time traffic. In some examples, the bandwidth allocation starts with a guaranteed minimum bandwidth for the beginning control traffic and then more bandwidth may be allocated in multiple discrete steps up to the guaranteed maximum as more VoWiFi calls are added. The guaranteed minimum bandwidth is configured such that all IPsec control and management data packet traffic can pass through.

Additional steps of guaranteed bandwidth may be assigned as a certain threshold of real time traffic is reached, and each step is configured such that it is equivalent to the bandwidth resources needed for one VoWiFi call. Because the VoWiFi calls are implemented in IPsec, individual calls may not be detected, but rather increases and/or decreases in packet traffic may be detected and, on that basis, allocated bandwidth steps may be either allocated and/or de-allocated. When minimal VoWiFi packet traffic may be detected, the packet traffic may be control and management VoWiFi packet traffic, for which there may be a guaranteed minimum bandwidth. When a sudden rise related to a new call is detected, a bandwidth allocation step may be allocated to VoWiFi packet traffic. When a sudden fall related to a dropped call is detected, a bandwidth allocation step may be de-allocated to VoWiFi packet traffic. In other words, when a decrease in the real-time VoWiFi packet traffic is detected, the VSAT(s) 110A/110B, the satellite network gateway 130, and/or the WiFi hot spot terminal 110C may take the bandwidth allocation one step down.

In examples according to the present disclosure, the VSAT(s) 110A/110B, the satellite network gateway 130, and/or the WiFi hot spot terminal 110C begin by allocating a guaranteed minimum bandwidth suitable for VoWiFi control/management data packet traffic, rather than the fixed reserved CBR allocated in the On-Demand Streaming (ODS) scheme suitable for a fully active VoWiFi call. By contrast with examples according to the present disclosure, the ODS scheme or mechanism is based on a static configuration, where the system recognizes/distinguishes packet traffic based on an IP level classification of the packet headers and begins by allocating the fixed reserved bandwidth for at least a full call, and then may allocate more statically configured bandwidth as each call is identified/distinguished through IP level classification. In the ODS scheme, packets for non-SIP voice sessions are identified by the destination/source addresses, destination port, and DCSP value in their packet headers. In the ODS scheme, as soon as an end user consumer device becomes active and sends/receives VoWiFi control and management traffic for initialization (but not for a VoWiFi call), an IPsec tunnel is established and a reserved configured CBR is allocated, even though an actual VoWiFi call has not started yet, thereby wasting bandwidth and network resources. By contrast, in examples according to the present disclosure, the VSAT(s) 110A/110B, the satellite network gateway 130, and/or the WiFi hot spot terminal 110C do not allocate the fixed reserved CBR of the ODS scheme (suitable for a fully active VoWiFi call), but rather allocate a guaranteed minimum bandwidth suitable for VoWiFi control/management data packet traffic.

In examples according to the present disclosure, the VSAT(s) 110A/110B, the satellite network gateway 130, and/or the WiFi hot spot terminal 110C may allocate:

- a guaranteed minimum for the real time traffic (i.e., the bandwidth usage of the VoWiFi packet traffic) of each satellite terminal 110 which subscribes to an adaptive real-time bandwidth service.
- a guaranteed minimum for non-real-time traffic of any satellite terminals 110 which have a strict/hard QoS.
- a stepwise adaptive bandwidth for the real-time traffic (i.e., the bandwidth usage of the VoWiFi packet traffic) of each satellite terminal 110, as required based on the measured throughput, up to the maximum guaranteed (if the bandwidth is available; one of ordinary skill in the art will appreciate that the maximum guaranteed real-time bandwidth can be oversubscribed across each satellite terminal 110).
- the guaranteed bandwidth beyond minimum for non-real-time traffic of satellite terminals 110 which have a strict/hard QoS.
- best effort bandwidth to either best effort or strict/hard QoS satellite terminals 110.

The VSAT(s) 110A/110B, the satellite network gateway 130, and/or the WiFi hot spot terminal 110C according to examples of the present disclosure may allocate the minimum resources needed when some initial VoWiFi packet traffic shows up from an end user consumer device 105. Then the VSAT(s) 110A/110B, the satellite network gateway 130, and/or the WiFi hot spot terminal 110C according to examples of the present disclosure determines, by using a configured threshold value or percentage, determine whether to allocate up a step (to a maximum) as real-time traffic (i.e., the bandwidth usage of the VoWiFi packet traffic) increases or down a step as real-time traffic (i.e., the bandwidth usage of the VoWiFi packet traffic) decreases. In some examples, the VSAT(s) 110A/110B, the satellite network gateway 130, and/or the WiFi hot spot terminal 110C first schedules all real-time traffic (i.e., VoWiFi packets) according to the adaptive bandwidth allocation and volume monitoring of the present disclosure, and then schedules all remaining traffic according to Weighted Fair Queueing (WFQ), in each Time Division Multiple Access (TDMA) frame (for satellite link communication).

Figure 2A:
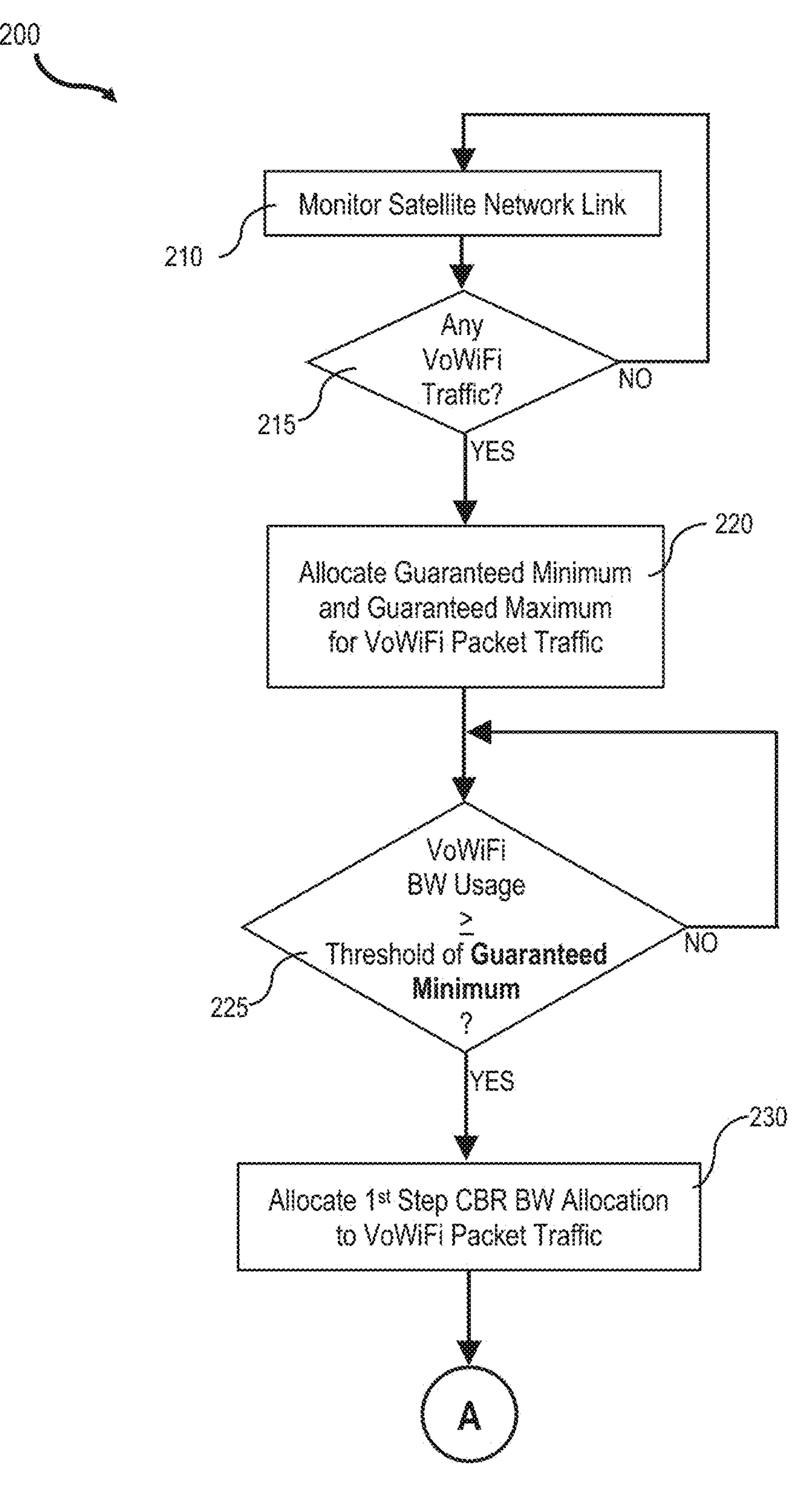
FIGS. 2A and 2B illustrate a flow diagram of a method of providing Adaptive Constant Bit Rate (ACBR) bandwidth allocation for real-time classified traffic in a satellite communication system, according to an example.
Figure 2B:
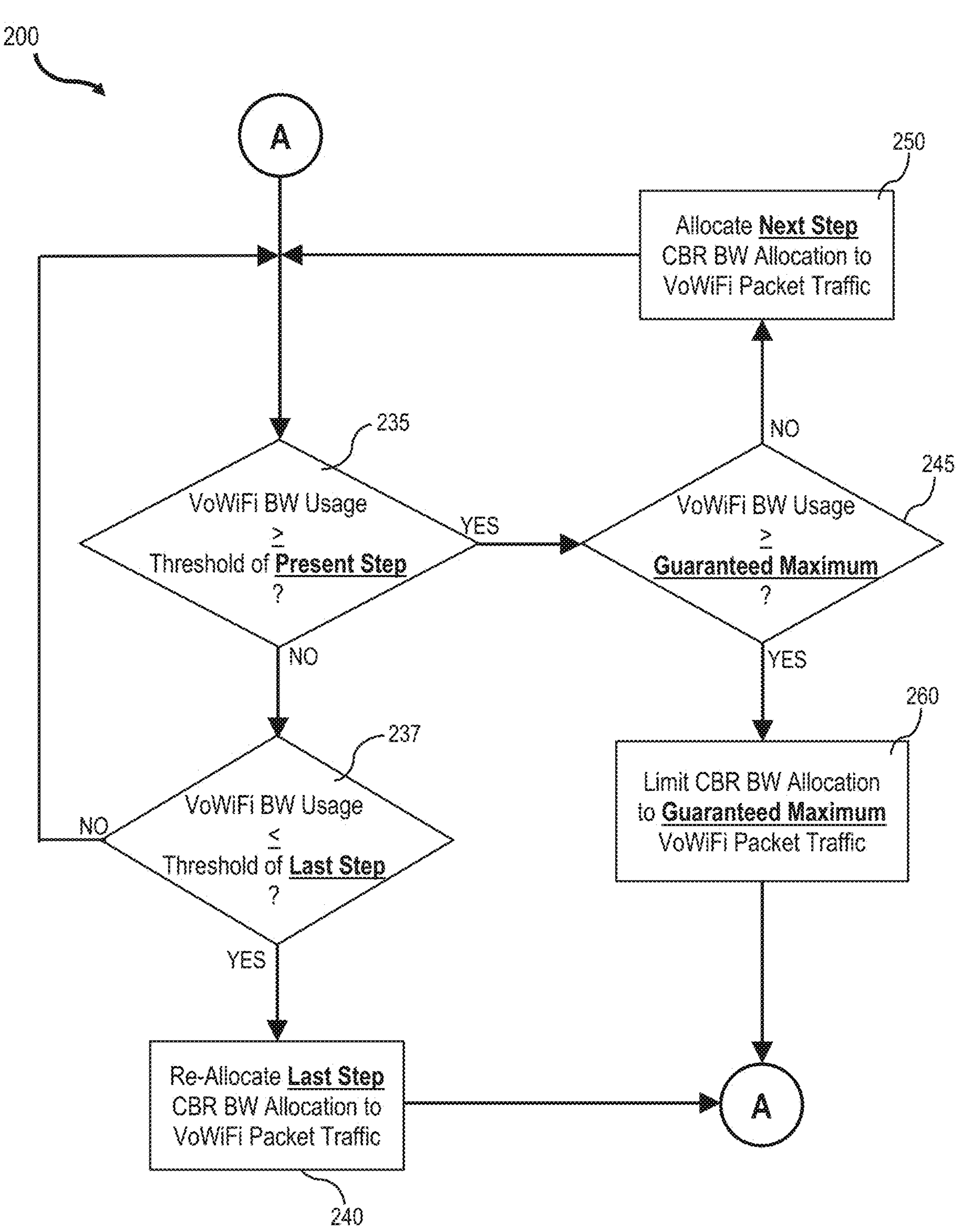

FIGS. 2A and 2B illustrate a flow diagram of a method of providing Adaptive Constant Bit Rate (ACBR) bandwidth allocation for real-time classified traffic in a satellite communication system, according to an example. The method 200 shown in FIGS. 2A and 2B is provided by way of example and may only be one part of an entire process/procedure. The method 200 may further omit parts of the method not germane to the present disclosure, as would be understood by one of ordinary skill in the art. Each block shown in FIGS. 2A and 2B may further represent one or more steps, processes, methods, or subroutines, as would be understood by one of ordinary skill in the art. For the sake of convenience and ease of explanation, the blocks in FIGS. 2A and 2B may refer to the components in FIG. 1 and/or descriptions or other figures described herein; however, the method 200 is not limited in any way to the components, apparatuses, and/or constructions shown in any of the figures described herein.

At block 210, the VSAT(s) 110A/110B, the satellite network gateway, and/or the WiFi hot spot terminal 110C may monitor a satellite network link. At block 215, the VSAT(s) 110A/110B, the satellite network gateway 130, and/or the WiFi hot spot terminal 110C may determine whether there is any VoWiFi packet traffic. In some examples, the VSAT(s) 110A/110B, the satellite network gateway 130, and/or the WiFi hot spot terminal 110C may determine whether there is any VoWiFi packet traffic by recognizing the destination port of the VoWiFi packet traffic, UDP port 4500. In some examples, the VSAT(s) 110A/110B, the satellite network gateway 130, and/or the WiFi hot spot terminal 110C may determine whether there is any VoWiFi packet traffic by recognizing both a particular DCSP value and the UDP destination port of 4500. For instance, the combination of a DCSP value of 0 and the UDP destination port of 4500 may identify the Network Address Translation (NAT) keep-alive traffic packets of an IPSec tunnel. As another instance, the combination of a DCSP value of 48 and the UDP destination port of 4500 may identify either ISAKMP packet traffic or IPSec voice data UDP packet traffic. In some examples, only one or more of the VSAT(s) 110A/110B and/or the WiFi hot spot terminal 110C may perform block 210. If the VSAT(s) 110A/110B, the satellite network gateway 130, and/or the WiFi hot spot terminal 110C determines there is VoWiFi packet traffic at block 215, the method 200 continues to block 220. If not, the method 200 keeps performing block 215, i.e., monitoring for VoWiFi packet traffic.

At block 220, the VSAT(s) 110A/110B, the satellite network gateway 130, and/or the WiFi hot spot terminal 110C may allocate the guaranteed minimum and the guaranteed maximum for real-time traffic (i.e., the bandwidth usage of the VoWiFi packet traffic). In FIG. 3B, the guaranteed minimum of 0.5 Mbps is indicated as the allocated bandwidth (BW) and the initial control/management data packet traffic is depicted as a low level of traffic volume. Going forward, the VSAT(s) 110A/110B, the satellite network gateway 130, and/or the WiFi hot spot terminal 110C may recognize real-time packet traffic by the destination port of UDP port 4500 in their packet headers. In some examples, only one or more of the VSAT(s) 110A/110B and/or the WiFi hot spot terminal 110C may recognize real-time packet traffic by the destination port of UDP port 4500 in their packet headers, going forward.

At block 225, the VSAT(s) 110A/110B, the satellite network gateway 130, and/or the WiFi hot spot terminal 110C may determine whether the real-time traffic volume (i.e., the bandwidth usage of the VoWiFi packet traffic) has reached the threshold value of the guaranteed minimum bandwidth. If not, the guaranteed minimum allocation is maintained (i.e., nothing changes). If the real-time traffic volume (i.e., the bandwidth usage of the VoWiFi packet traffic) has reached the threshold value of the first step allocation bandwidth, the method 200 continues to block 230.

At block 230, having determined that the real-time traffic volume (i.e., the bandwidth usage of the VoWiFi packet traffic) has reached the threshold value of the guaranteed minimum bandwidth in block 225, the VSAT(s) 110A/110B, the satellite network gateway 130, and/or the WiFi hot spot terminal 110C may allocate the CBR bandwidth for VoWiFi packet traffic to the first step allocation bandwidth, i.e., an allocation appropriate and/or sufficient for a single active VoWiFi call. In the example shown in FIG. 3C, the real-time traffic volume (i.e., the bandwidth usage of the VoWiFi packet traffic) has reached the threshold value of 75% of the guaranteed minimum bandwidth of 0.5 Mbps (indicating there may be a single active VoWiFi call), and thus the VoWiFi traffic allocation has increased to the first step allocation bandwidth (Step 1), 1.5 Mbps. Once the VSAT(s) 110A/110B, the satellite network gateway 130, and/or the WiFi hot spot terminal 110C allocates the CBR bandwidth for VoWiFi packet traffic to the first step allocation bandwidth, i.e., an allocation appropriate and/or sufficient for a single active VoWiFi call, in block 230, the method 200 continues from FIG. 2A, through circle A, to block 335 in FIG. 2B.

At block 235 in FIG. 2B, the VSAT(s) 110A/110B, the satellite network gateway 130, and/or the WiFi hot spot terminal 110C may determine whether the real-time traffic volume (i.e., the bandwidth usage of the VoWiFi packet traffic) has reached the threshold value of the present step VoWiFi allocation bandwidth. If not, the method 200 continues to block 237. In the example shown in FIG. 3D, since the real-time traffic volume (i.e., the bandwidth usage of the VoWiFi packet traffic) has not reached the threshold value of 75% of the first step allocation bandwidth (Step 1) of 1.5 Mbps, the method 200 would continue to block 237 in that instance. If the real-time traffic volume (i.e., the bandwidth usage of the VoWiFi packet traffic) has reached the threshold value of the present step VoWiFi allocation bandwidth at block 235, the method 200 continues to block 245. In this instance (i.e., the first instance-after block 230), the present step is the first step VoWiFi bandwidth allocation, and thus the VSAT(s) 110A/110B, the satellite network gateway 130, and/or the WiFi hot spot terminal 110C determines whether the real-time traffic volume (i.e., the bandwidth usage of the VoWiFi packet traffic) has reached the threshold value of the first step VoWiFi allocation bandwidth in block 235. In the example shown in FIG. 3E, since the real-time traffic volume (i.e., the bandwidth usage of the VoWiFi packet traffic) has reached the threshold value of 75% of the first step allocation bandwidth (Step 1) of 1.5 Mbps, the method 200 would continue to block 245 in that instance.

At block 237 in FIG. 2B, after determining the real-time traffic volume (i.e., the bandwidth usage of the VoWiFi packet traffic) has not reached the threshold value of the present step VoWiFi allocation bandwidth in block 235, the VSAT(s) 110A/110B, the satellite network gateway 130, and/or the WiFi hot spot terminal 110C may determine whether the real-time traffic volume (i.e., the bandwidth usage of the VoWiFi packet traffic) has reached the threshold value of the previous or last step VoWiFi allocation bandwidth. If not, the present step VoWiFi allocation bandwidth is maintained, i.e., nothing changes, and the method 200 returns to monitoring the VoWiFi packet traffic at block 235. If the real-time traffic volume (i.e., the bandwidth usage of the VoWiFi packet traffic) has reached the threshold value of the previous step VoWiFi allocation bandwidth at block 237, the method 200 continues to block 240. In this instance (i.e., the first instance-after reaching the first step in block 230), the previous step is the guaranteed minimum VoWiFi bandwidth allocation, and thus the VSAT(s) 110A/110B, the satellite network gateway 130, and/or the WiFi hot spot terminal 110C determines whether the real-time traffic volume (i.e., the bandwidth usage of the VoWiFi packet traffic) has reached the threshold value of the guaranteed minimum VoWiFi allocation bandwidth in block 237.

At block 245 in FIG. 2B, after determining the real-time traffic volume (i.e., the bandwidth usage of the VoWiFi packet traffic) has reached the threshold value of the present step VoWiFi allocation bandwidth in block 235, the VSAT(s) 110A/110B, the satellite network gateway 130, and/or the WiFi hot spot terminal 110C may determine whether the real-time traffic volume (i.e., the bandwidth usage of the VoWiFi packet traffic) has reached the guaranteed maximum VoWiFi allocation bandwidth. If the real-time traffic volume (i.e., the bandwidth usage of the VoWiFi packet traffic) has not reached the guaranteed maximum VoWiFi allocation bandwidth in block 245, the method 200 continues to block 250. In this instance (i.e., the first instance-after block 235), the real-time traffic volume (i.e., the bandwidth usage of the VoWiFi packet traffic) has not reached the guaranteed maximum VoWiFi allocation bandwidth in block 245. If the real-time traffic volume (i.e., the bandwidth usage of the VoWiFi packet traffic) has reached the guaranteed maximum VoWiFi allocation bandwidth in block 245, the method 200 continues to block 260.

At block 250, after determining the real-time traffic volume (i.e., the bandwidth usage of the VoWiFi packet traffic) has reached the threshold value of the present step VoWiFi allocation bandwidth in block 235 but has not reached the guaranteed maximum VoWiFi allocation bandwidth in block 245, the VSAT(s) 110A/110B, the satellite network gateway 130, and/or the WiFi hot spot terminal 110C may allocate the CBR bandwidth for VoWiFi packet traffic to the next step bandwidth allocation. In this instance (i.e., the first instance-after blocks 235 and 237), the next step is the second step VoWiFi bandwidth allocation, and thus the VSAT(s) 110A/110B, the satellite network gateway 130, and/or the WiFi hot spot terminal 110C may allocate the CBR bandwidth for VoWiFi packet traffic to the second step, i.e., an allocation appropriate for two active VoWiFi calls. In the example shown in FIG. 3E, the real-time traffic volume (i.e., the bandwidth usage of the VoWiFi packet traffic) has reached the threshold value of 75% of the guaranteed minimum bandwidth of 1.5 Mbps (indicating there is another active VoWiFi call), and thus the VoWiFi traffic allocation has increased to the second step allocation bandwidth (Step 2), 2.5 Mbps in block 250. After block 250, the method 200 returns to monitoring the VoWiFi packet traffic at block 235.

At block 260, after determining the real-time traffic volume (i.e., the bandwidth usage of the VoWiFi packet traffic) has reached the threshold value of the present step VoWiFi allocation bandwidth in block 235 and has also reached the guaranteed maximum VoWiFi allocation bandwidth in block 245, the VSAT(s) 110A/110B, the satellite network gateway 130, and/or the WiFi hot spot terminal 110C may limit the CBR bandwidth for VoWiFi packet traffic to the guaranteed maximum bandwidth allocation. In some examples, if the satellite terminal 110 (e.g., the VSAT terminal 110A or 110B, or the WiFi hot spot terminal 110C) exceeds a certain number of VoWiFi calls, the satellite terminal 110 may not be allocated any more bandwidth. When a user exceeds their maximum guaranteed subscription for real time priority packet traffic, either all the other VoWiFi calls will suffer, or their real-time priority packet traffic will steal other bandwidth, which, in the worst case, may starve all of the other priority packet traffic. It may be the responsibility of the network operator to both inform the user of, and enforce, a limit on the number of VoWiFi calls that can be made. After block 260, the method 200 returns, via circle A, to monitoring the VoWiFi packet traffic at block 235.

At block 240, after determining the real-time traffic volume (i.e., the bandwidth usage of the VoWiFi packet traffic) has reached the threshold value of the previous or last step VoWiFi allocation bandwidth in block 237, the VSAT(s) 110A/110B, the satellite network gateway 130, and/or the WiFi hot spot terminal 110C may allocate the CBR bandwidth for VoWiFi packet traffic to the previous step. In the first instance (i.e., after first performing blocks 230, 235, and 237), the previous step is the guaranteed minimum VoWiFi bandwidth allocation, and thus the VSAT(s) 110A/110B, the satellite network gateway 130, and/or the WiFi hot spot terminal 110C may re-allocate the CBR bandwidth for VoWiFi packet traffic to the guaranteed minimum, i.e., an allocation appropriate when there are no active VoWiFi calls. In all other instances, the VSAT(s) 110A/110B, the satellite network gateway 130, and/or the WiFi hot spot terminal 110C may allocate the CBR bandwidth for VoWiFi packet traffic to the previous step bandwidth allocation. After block 240, the method 200 returns, via circle A, to monitoring the VoWiFi packet traffic at block 235.

FIGS. 3A-3G are graphs of bandwidth usage accompanying the description of the method 200 in FIGS. 2A and 2B for providing Adaptive Constant Bit Rate (ACBR) bandwidth allocation to real-time classified traffic in a satellite communication system, according to an example. More specifically, FIGS. 3A-3G are graphs of specific examples of how bandwidth may be allocated as conditions change over time. As shown in FIG. 3A, the guaranteed minimum is 0.5 Mbps and each step represents an increase of another 1 Mbps, i.e., Step 1 is 1.5 Mbps; Step 2 is 2.5 Mbps; Step 3 is 3.5 Mbps; and the last step, which is the guaranteed maximum, is 4.5 Mbps. As described in reference to FIGS. 3A-3G, a threshold value of 75% may be used to trigger when to go to the next step.

In the example shown in FIG. 3F, the real-time traffic volume (i.e., the bandwidth usage of the VoWiFi packet traffic) has not increased enough to reach the threshold value of 75% of the present step interval, before the third step bandwidth allocation (Step 3), and thus the CBR bandwidth allocation remains at the second step bandwidth allocation (Step 2). In other words, after reaching the second step allocation bandwidth in block 250 (i.e., FIG. 3E), the method 200 returned to block 235, which was negative, leading to block 237, which was also negative, thus leading back to monitoring the real-time traffic volume (i.e., the bandwidth usage of the VoWiFi packet traffic) at block 235—thereby remaining at the second step bandwidth allocation (Step 2) in FIG. 3F.

In the example shown in FIG. 3G, having gone from the high packet traffic bandwidth usage of FIG. 3F (having the second step allocation bandwidth (Step 2) of 2.5 Mbps) and decreased to below the threshold value of 75% of the previous step, i.e., the first step allocation bandwidth (Step 1), 1.5 Mbps (indicating a VoWiFi call was dropped), and the VoWiFi traffic allocation was thus decreased to the first step allocation bandwidth (Step 1), 1.5 Mbps. In other words, after reaching the second step allocation bandwidth in block 250 (i.e., FIGS. 3E and 3F), the method 200 returned to block 235, which was negative, thus leading to block 237, which was positive, leading to block 240, where the VoWiFi traffic allocation was decreased from the second step allocation bandwidth (Step 2) of 2.5 Mbps to the first step allocation bandwidth (Step 1) of 1.5 Mbps.

In examples with higher latency, such as, e.g., when the satellite 120 is a GEO satellite and the round-trip time (RTT) may be as high as 1 second, there may not be enough bandwidth to carry all of the VoWiFi packets when a new VoWiFi call starts or arrives, because of the time delay before the satellite terminal 110 knows the next step allocation bandwidth. During this period, some VoWiFi packets may be dropped randomly but, after the allocation bandwidth is known, the VoWiFi packet traffic may be steady. However, in some cases, the real-time packet traffic may not steady but rather may steal bandwidth allocated to other priority packet traffic. In most examples (such as, e.g., in a LEO satellite network), however, the latency caused by the RTT is not a significant factor for real time packet traffic bandwidth allocation. In some examples, an additional time out step may be added to the method 200 after block 225, where, if the real time traffic never reached the threshold, the method 200 would de-allocate the guaranteed minimum bandwidth allocation and return to monitoring in block 215.

In some examples, both an adaptive bandwidth allocation system and method in accordance with the present disclosure and an ODS allocation scheme may be employed. In such examples, an adaptive bandwidth allocation system and method in accordance with the present disclosure may be used for any real time and/or high priority traffic, such as VoWiFi calls, while the ODS scheme may be employed with other packet traffic flows. In such examples, the ODS scheme may work simultaneously with an adaptive bandwidth allocation system and method in accordance with the present disclosure, and may be employed as follows:

- when initially some packet traffic arrives from a new terminal a minimum guaranteed allocation may be given to that terminal.
- when the traffic throughput from a terminal exceeds a certain threshold, more bandwidth than the minimum guaranteed allocation may be allocated to that terminal, either, e.g., the guaranteed maximum or a step towards the guaranteed maximum. In the latter case, multiple discrete steps may be configured between the guaranteed minimum and maximum, and, as throughput increases, each next step may be allocated until the allocation reaches the maximum guaranteed.
- when the traffic demand from the terminal exceeds the maximum guaranteed, the maximum portion may be allocated to that terminal based on the backlog in a best effort manner.

Figure 4:
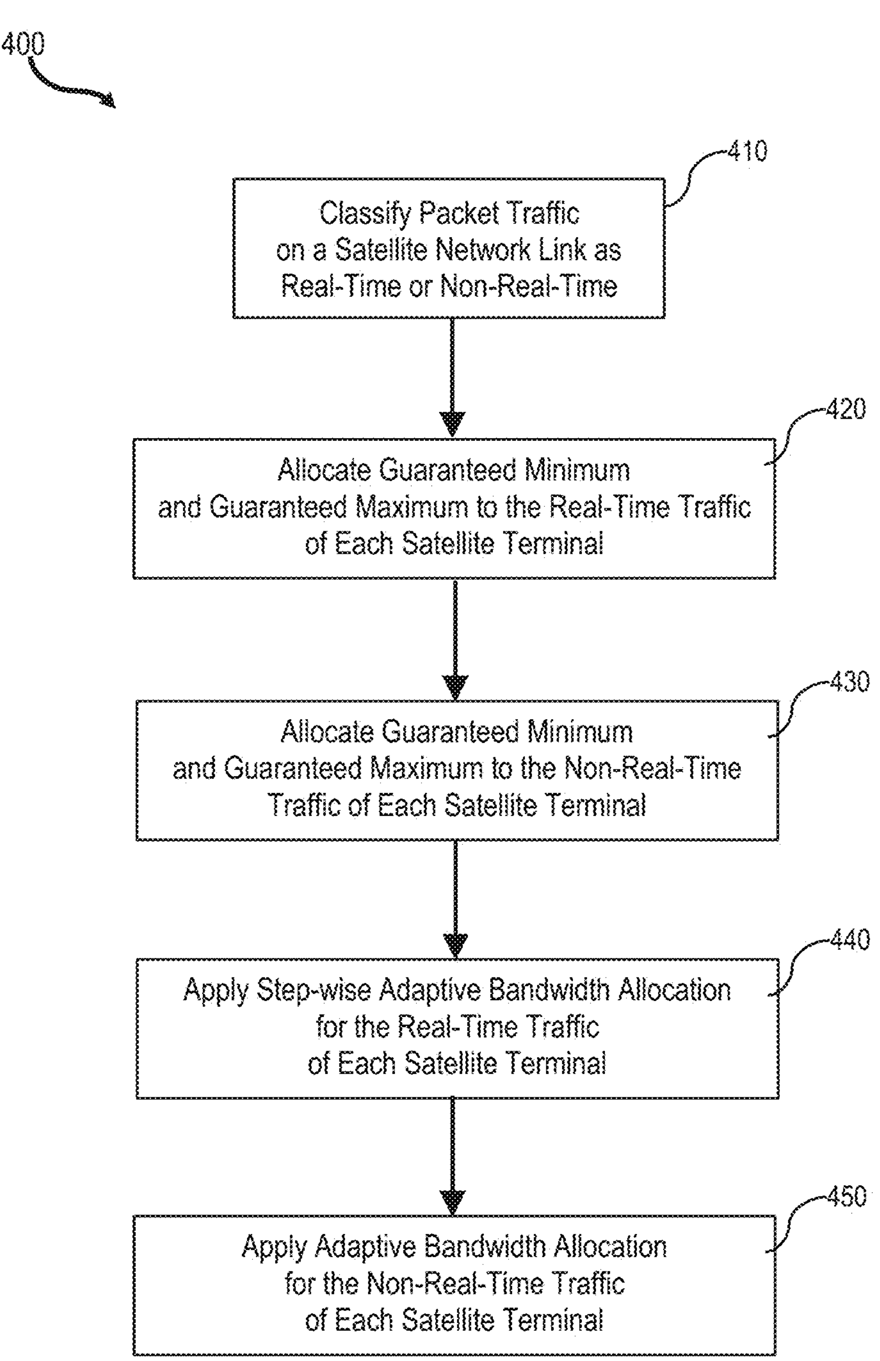
FIG. 4 illustrates a flow diagram of a method of bandwidth classification and allocation for real-time and non-real-time traffic in a satellite communication system, according to an example.

FIG. 4 illustrates a flow diagram of a method of bandwidth classification and allocation for real-time and non-real-time traffic in a satellite communication system, according to an example. The method 400 shown in FIG. 4 is provided by way of example and may only be one part of an entire process/procedure. The method 400 may further omit parts of the method not germane to the present disclosure, as would be understood by one of ordinary skill in the art. Each block shown in FIG. 4 may further represent one or more steps, processes, methods, or subroutines, as would be understood by one of ordinary skill in the art. For the sake of convenience and ease of explanation, the blocks in FIG. 4 may refer to the components in FIG. 1 and/or descriptions or other figures described herein; however, the method 400 is not limited in any way to the components, apparatuses, and/or constructions shown in any of the figures described herein.

At block 410, packet traffic on a satellite network link may be classified as either real-time packet traffic or non-real-time packet traffic. In some examples, the real-time packet traffic may be priority communication traffic, voice traffic, and/or VoWiFi packet traffic. In some examples, the non-real-time packet traffic may be non-voice traffic, lower priority communication traffic, and/or communication traffic with different priorities than VoWiFi packet traffic. In some examples, whether packet traffic is classified as real-time or non-real-time may depend upon the information in the headers of the packets in the packet traffic. In some examples, the destination address, the source address, the destination port, the source port, and/or the DSCP value in the packet headers may be used to classify real-time and non-real-time packet traffic.

At block 420, a guaranteed minimum bandwidth and a guaranteed maximum bandwidth may be allocated to the real-time traffic of each satellite terminal 110. In some examples, the guaranteed minimum bandwidth allocated to the real-time traffic may be configured such that all IPsec control and management data packet traffic can pass through. In some examples, the guaranteed maximum bandwidth allocated to the real-time traffic may be configured such that a maximum number of individual VoWiFi calls may be distributed among all end user devices presently connected to the satellite terminal. In some examples, the maximum guaranteed real-time bandwidth may be oversubscribed across each satellite terminal.

At block 430, a guaranteed minimum bandwidth and a guaranteed maximum bandwidth may be allocated to the non-real-time traffic of each satellite terminal 110. In some examples, both the guaranteed minimum bandwidth and the guaranteed maximum bandwidth of the non-real-time traffic may be allocated on a per frame basis after the real-time time traffic may be allocated. In some examples, the guaranteed minimum bandwidth for the non-real-time traffic may be allocated with priority for those satellite terminals which may have a strict and/or hard QoS and/or QoE. In some examples, any bandwidth for non-real-time traffic after the guaranteed minimum bandwidth for the non-real-time traffic is allocated may be allocated with priority for those satellite terminals which may have a strict and/or hard QoS and/or QoE.

At block 440, a stepwise adaptive bandwidth allocation method may be applied to the real-time traffic of each satellite terminal 110. In some examples, an adaptive bandwidth allocation method similar to the example shown in FIGS. 2A and 2B may be employed. In some examples, a minimum guaranteed bandwidth is allocated when VoWiFi packet traffic is first detected (i.e., when IPSec control traffic is detected, before an actual VoWiFi call is made). Thus, if no VoWiFi call is made (and there is only control/management packet traffic) and/or during the time before any VoWiFi call is made, less resources are allocated. In some examples, the VoWiFi allocation is increased in a series of discrete steps as more VoWiFi calls are added (and/or more real-time traffic, i.e., the bandwidth usage of the VoWiFi packet traffic, detected). In some examples, each step may be taken when a pre-set threshold of real-time traffic (i.e., the bandwidth usage of the VoWiFi packet traffic) is reached.

At block 450, an adaptive bandwidth allocation method may be applied to the non-real-time traffic of each satellite terminal 110. In some examples, an On-Demand Streaming (ODS) scheme may be employed for the non-real-time traffic while the stepwise adaptive bandwidth allocation method may be employed for the real-time traffic. In some examples, all real-time traffic (such as, e.g., VoWiFi packets)

may be allocated in block 440 according to the adaptive bandwidth allocation and volume monitoring of the present disclosure, and then all remaining traffic, including the non-real-time traffic, may be allocated in block 450 according to an adaptive bandwidth allocation with a lower priority than the real-time traffic. In some examples, the non-real-time traffic may be allocated, after the real-time traffic, according to Weighted Fair Queueing (WFQ).

It may be appreciated by one of ordinary skill in the art that any of the blocks in FIG. 4 may occur in a different order and/or simultaneously (e.g., in parallel), may not be performed, and/or may be performed multiple times. In some examples, two or more of blocks 410, 420, and 430 in FIG. 4 may be performed substantially simultaneously; similarly, blocks 440 and 450 in FIG. 4 may be performed substantially simultaneously.

It may be appreciated that, in certain aspects, a single component may be replaced by multiple components, and multiple components may be replaced by a single component, to provide an element or structure or to perform a given function or a set of functions. Except where such substitution may not be operative to practice certain examples of the present systems and methods, such substitution may be considered within the scope of the ongoing description. For instance, it may be appreciated that separate modules/components shown in the FIGS. may be implemented as integrated into as a single module or component without departing from the scope and functionality of the present disclosure.

Figure 5:
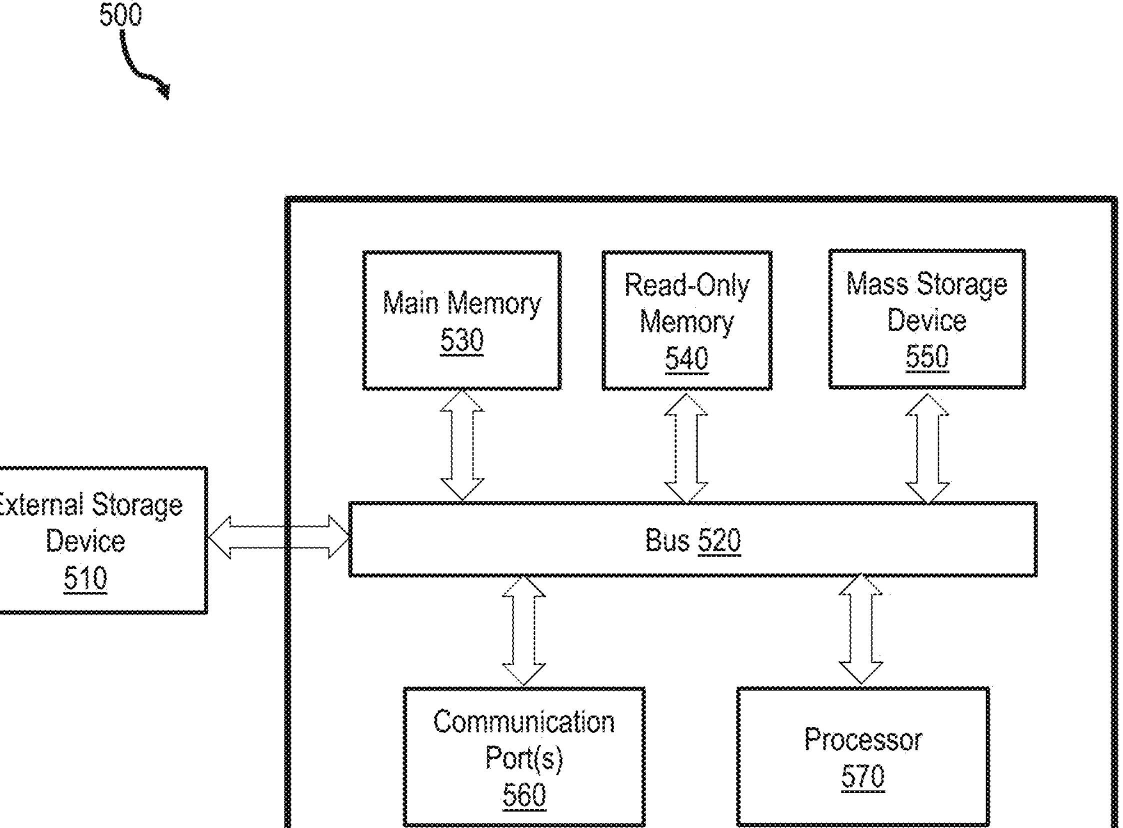
FIG. 5 illustrates a computer system in which or with which an example of the present disclosure may be implemented.

FIG. 5 illustrates a computer system 500 in which or with which examples of the present systems may be implemented. In particular, the disclosed system, such as the VSAT(s) 110A/110B, the satellite network gateway 130, and/or the WiFi hot spot terminal 110C in FIG. 1, may be implemented as the computer system 500.

Referring to FIG. 5, the computer system 500 may include an external storage device 510, a bus 520, a main memory 530, a read-only memory 540, a mass storage device 550, communication port(s) 560, and a processor 570. A person skilled in the art will appreciate that the computer system 500 may include more than one processor and communication ports. The communication port(s) 560 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 560 may be chosen depending on a network, such a Local Area Network (LAN), Wide Area Network (WAN), or any network to which the computer system 500 connects.

The main memory 530 may be random access memory (RAM), or any other dynamic storage device commonly known in the art. The read-only memory 540 may be any static storage device(s) including, but not limited to, a Programmable Read Only Memory (PROM) chips for storing static information e.g., start-up or basic input/output system (BIOS) instructions for the processor 570. The mass storage device 550 may be any current or future mass storage solution, which may be used to store information and/or instructions. The bus 520 communicatively couples the processor 570 with the other memory, storage, and communication blocks. The bus 520 can be, e.g., a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 570 to the computer system 500. Optionally, operator and administrative interfaces, e.g., a display, keyboard, and a cursor control device, may also be coupled to the bus 520 to support direct operator interaction with the computer system 500. Other operator and administrative interfaces may be provided through network connections connected through the communication port(s) 560. In no way should the aforementioned exemplary computer system limit the scope of the present disclosure.

In some examples, the method or methods described above may be executed or carried out by the computing system 500 including a tangible computer-readable storage medium, also described herein as a storage machine, that holds machine-readable instructions executable by a logic machine (i.e., a processor or programmable control device) to provide, implement, perform, and/or enact the above described methods, processes and/or tasks, such as main memory 530, read-only memory 540, and/or mass storage device 550. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system 500 may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption.

In some examples, the computing system 500 may include an input subsystem that receives user input. The input subsystem may be configured to connect to and receive input from devices such as a mouse, keyboard, or gaming controller. For example, a user input may indicate a request that certain task is to be executed by the computing system 500, such as requesting the computing system 500 to display any of the above-described information or requesting that the user input updates or modifies existing stored information for processing. A communication subsystem may allow the methods described above to be executed or provided over a computer network. For example, the communication subsystem may be configured to enable the computing system 500 to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for particular implementations. It should also be appreciated that the systems and methods, as described herein, may also include, or communicate with, other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the systems described herein.

Moreover, single components may be provided as multiple components, and vice versa, to perform the functions and features described herein. It should be appreciated that the components of the system described herein may operate in partial or full capacity, or it may be removed entirely. It should also be appreciated that communication, monitoring, and processing techniques described herein, for example, may also be performed partially or in full by other various components of the overall system.

It should be appreciated that memories and/or data stores may also be provided to the apparatuses, systems, and methods described herein, and may include volatile and/or nonvolatile data storage that may store data and software or firmware including machine-readable instructions. The software or firmware may include subroutines or applications that perform the functions of the system and/or run one or more applications that utilize data from the system or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, it should be appreciated that the systems and methods described herein may also be used in other various systems and other implementations. For example, these may include cable or optical communication systems, telecommunication systems, and/or other various satellite systems. By leveraging existing equipment, the system and methods described herein may provide efficient processing techniques and a cost-effective approach that may be readily integrated into various and existing network equipment. The systems and methods described herein may provide simplicity and adaptability to small or large satellite communication systems. Ultimately, the systems and methods described herein may increase efficiency, reduce cost, maximize existing equipment, minimize adverse effects of traditional systems, and improve satellite communication capabilities.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:

a processor;

a memory to store instructions which, when executed by the processor, cause the processor to:

monitor a satellite network link for Voice over WiFi (VoWiFi) packet traffic based on information in packet headers comprising at least one of a source port, a destination port, and a Differentiated Services Code Point (DSCP) value;

when it is determined that there is VoWiFi packet traffic over the satellite network link based on the information in the packet headers, allocate a guaranteed minimum bandwidth for the VoWiFi packet traffic;

determine whether bandwidth usage of the VoWiFi packet traffic exceeds a threshold value; and when it is determined that the bandwidth usage of the VoWiFi packet traffic exceeds the threshold value, allocate a first step allocation bandwidth for the VoWiFi packet traffic, wherein the first step allocation bandwidth is a first of a plurality of step allocation bandwidths, wherein the threshold value is a percentage of each step allocation bandwidth, and the percentage of the first step allocation bandwidth is less than the guaranteed minimum bandwidth.

2. The system of claim 1, wherein the VoWiFi packet traffic is Voice over Internet Protocol (VOIP) packet traffic.

3. The system of claim 1, wherein the guaranteed minimum bandwidth is configured to support Internet Protocol security (IPSec) control and management data packet traffic.

4. The system of claim 1, wherein the first step allocation bandwidth is configured to support an active VoWiFi call.

5. The system of claim 1, wherein the instructions, when executed by the processor, further cause the processor to:

after allocating the first step allocation bandwidth for the VoWiFi packet traffic, determine when the bandwidth usage of the VoWiFi packet traffic exceeds the threshold value of the first step allocation bandwidth; and when it is determined that the bandwidth usage of the VoWiFi packet traffic exceeds the threshold value of the first step allocation bandwidth, allocate a second step allocation bandwidth for the VoWiFi packet traffic.

6. The system of claim 1, wherein the instructions, when executed by the processor, further cause the processor to:

after allocating the first step allocation bandwidth for the VoWiFi packet traffic, determine when the bandwidth usage of the VoWiFi packet traffic is less than the threshold value of the guaranteed minimum bandwidth; and when it is determined that the bandwidth usage of the VoWiFi packet traffic is less than the threshold value of the guaranteed minimum bandwidth, re-allocate the guaranteed minimum bandwidth for the VoWiFi packet traffic.

7. The system of claim 1, wherein the instructions, when executed by the processor, further cause the processor to:

when it is determined that there is VoWiFi packet traffic over the satellite network link, allocate a guaranteed maximum bandwidth to the VoWiFi packet traffic.

8. The system of claim 7, wherein the instructions, when executed by the processor, further cause the processor to:

determine whether the bandwidth usage of the VoWiFi packet traffic reaches the guaranteed maximum bandwidth; and when it is determined that the bandwidth usage of the VoWiFi packet traffic reaches the guaranteed maximum bandwidth, limit the bandwidth usage of the VoWiFi packet traffic to the guaranteed minimum bandwidth.

9. A method for allocating bandwidth to Voice over WiFi (VoWiFi) packet traffic over a satellite network link, comprising:

monitoring, by a processor, a satellite network link for any VoWiFi packet traffic based on information in packet headers comprising at least one of a source port, a destination port, and a Differentiated Services Code Point (DSCP) value;

determining, by a processor, when there is any VoWiFi packet traffic over the satellite network link based on the information in the packet headers;

when it is determined there is VoWiFi packet traffic over the satellite network link, allocating, by a processor, a guaranteed minimum bandwidth for the VoWiFi packet traffic;

determining, by a processor, whether bandwidth usage of the VoWiFi packet traffic exceeds a threshold value; and allocating, by a processor, a first step allocation bandwidth for the VoWiFi packet traffic, when it is determined that the bandwidth usage of the VoWiFi packet traffic exceeds the threshold value, wherein the first step allocation bandwidth is a first of a plurality of step allocation bandwidths, wherein the threshold value is a percentage of each step allocation bandwidth, and the percentage of the first step allocation bandwidth is less than the guaranteed minimum bandwidth.

10. The method of claim 9, further comprising:

after allocating the first step allocation bandwidth for the VoWiFi packet traffic, determining, by a processor, when the bandwidth usage of the VoWiFi packet traffic exceeds the threshold value of the first step allocation bandwidth; and allocating, by a processor, the first step allocation bandwidth for the VoWiFi packet traffic, when it is determined that the bandwidth usage of the VoWiFi packet traffic exceeds the threshold value of the first step allocation bandwidth.

11. The method of claim 9, further comprising:

after allocating the first step allocation bandwidth for the VoWiFi packet traffic, determining, by a processor, when the bandwidth usage of the VoWiFi packet traffic is less than the threshold value of the first step allocation bandwidth; and re-allocating the guaranteed minimum bandwidth for the VoWiFi packet traffic, when it is determined that the bandwidth usage of the VoWiFi packet traffic is less than the threshold value of the first step allocation bandwidth.

12. The method of claim 9, further comprising:

allocating, by a processor, a guaranteed maximum bandwidth for the VoWiFi packet traffic when there is VoWiFi packet traffic over the satellite network link.

13. The method of claim 9, further comprising:

determining, by a processor, whether the bandwidth usage of the VoWiFi packet traffic reaches the guaranteed maximum bandwidth; and limiting, by a processor, the bandwidth usage of the VoWiFi packet traffic to the guaranteed minimum bandwidth when it is determined that the bandwidth usage of the VoWiFi packet traffic reaches the guaranteed maximum bandwidth.

14. The method of claim 9, wherein the VoWiFi packet traffic is Voice over Internet Protocol (VOIP) packet traffic.

15. The method of claim 9, wherein the guaranteed minimum bandwidth is configured to support Internet Protocol security (IPSec) control and management data packet traffic.

16. The method of claim 9, wherein the first step allocation bandwidth is configured to support an active VoWiFi call.

17. A non-transitory computer-readable storage medium having an executable stored thereon, which when executed instructs a processor to perform a method as follows:

monitoring a satellite network link for any VoWiFi packet traffic based on information in packet headers comprising at least one of a source port, a destination port, and a Differentiated Services Code Point (DSCP) value;

determining whether there is any VoWiFi packet traffic over the satellite network link based on the information in the packet headers;

when it is determined that there is VoWiFi packet traffic over the satellite network link, allocating a guaranteed minimum bandwidth for the VoWiFi packet traffic;

determining whether bandwidth usage of the VoWiFi packet traffic exceeds a threshold value;

allocating a first step allocation bandwidth for the VoWiFi packet traffic, when it is determined that the bandwidth usage of the VoWiFi packet traffic exceeds the threshold value, wherein the first step allocation bandwidth is a first of a plurality of step allocation bandwidths, wherein the threshold value is a percentage of each step allocation bandwidth, and the percentage of the first step allocation bandwidth is less than the guaranteed minimum bandwidth; and after allocating the first step allocation bandwidth for the VoWiFi packet traffic:

determining when the bandwidth usage of the VoWiFi packet traffic exceeds the threshold value of the first step allocation bandwidth;

allocating the second step allocation bandwidth for the VoWiFi packet traffic, when it is determined that the bandwidth usage of the VoWiFi packet traffic exceeds the threshold value of the first step allocation bandwidth;

determining when the bandwidth usage of the VoWiFi packet traffic is less than the threshold value of the first step allocation bandwidth; and re-allocating the guaranteed minimum bandwidth for the VoWiFi packet traffic, when it is determined that the bandwidth usage of the VoWiFi packet traffic is less than the threshold value of the first step allocation bandwidth.

18. The non-transitory computer-readable storage medium of claim 17, wherein the executable stored thereon, when executed further instructs the processor to perform a method as follows:

when there is VoWiFi packet traffic over the satellite network link, allocating a guaranteed maximum bandwidth for the VoWiFi packet traffic;

determining whether the bandwidth usage of the VoWiFi packet traffic reaches the guaranteed maximum bandwidth; and limiting the bandwidth usage of the VoWiFi packet traffic to the guaranteed minimum bandwidth when it is determined that the bandwidth usage of the VoWiFi packet traffic reaches the guaranteed maximum bandwidth.

* * * * *